| United States Patent [19] | [11] 3,843,602 |
|---|---|
| Kruh | [45] Oct. 22, 1974 |

[54] SOLUBLE AMIDE-IMIDE POLYMERS TERMINATED WITH OLEFIN GROUPS

[75] Inventor: Daniel Kruh, Schenectady, N.Y.

[73] Assignee: General Electric Company, Schenectady, N.Y.

[22] Filed: Apr. 24, 1970

[21] Appl. No.: 31,731

[52] U.S. Cl. ........ 260/47 CP, 117/124 E, 117/128.4, 117/161 P, 161/197, 161/227, 260/2.5 N, 260/30.2, 260/32.6 N, 260/47 CB, 260/65, 260/77.5 R, 260/78 TF, 260/78 UA
[51] Int. Cl. ............................................. C08g 20/32
[58] Field of Search ........ 260/47 CP, 47 CB, 78 TF, 260/78 UA, 77.5 R, 65

[56] References Cited
UNITED STATES PATENTS

| 3,352,834 | 11/1967 | Schmitt et al. | 260/78 |
| 3,522,277 | 7/1970 | Suter et al. | 260/346.6 |
| 3,528,950 | 9/1970 | Lubowitz | 260/78.4 |
| 3,546,152 | 12/1970 | Bolton | 260/29.2 |
| 3,562,223 | 2/1971 | Bargain et al. | 260/78 |
| 3,562,787 | 2/1971 | Naselow | 260/30.2 |

FOREIGN PATENTS OR APPLICATIONS

| 904,559 | 8/1962 | Great Britain | 260/78 UA |
| 1,537,135 | 2/1968 | France | 260/47 CP |

*Primary Examiner*—Lester L. Lee

[57] ABSTRACT

New economic prepolymers containing aromatic amide and imide groups, and terminated with olefinic groups, cure readily with heat, with or without catalyst and without the evolution of volatiles to give void-free, tough, flame-resistant, cross-linked and thermally stable imide-containing polymers.

Diamine is reacted with an acidic material containing trimellitic anhydride or its derivatives and the resulting prepolymer diamine is further treated to provide olefin-containing end groups. The system can be dehydrated to afford the completely imidized prepolymer which can be used for solution and/or solid applications.

10 Claims, No Drawings

SOLUBLE AMIDE-IMIDE POLYMERS TERMINATED WITH OLEFIN GROUPS

COMPOSITIONS

This invention relates to new and useful compositions of matter. More particularly, it relates to new soluble and solid processable, economic prepolymer compositions containing aromatic amide and imide groups, in various molecular weight ranges, and terminated with olefin groups. The use of aromatic imide-containing polymers and prepolymers and the like in applications where thermal stability is required is well known. However, a general deficiency of such materials is that the final aromatic imide-containing polymer must be derived by a relatively long cure at high temperatures as well as through the dehydration of amide acid or similar groups with attendant evolution of volatiles. Once completely imidized these materials are no longer soluble. Further, for solid or bulk or solventless applications, these entirely imidized materials have a very high or no glass transition temperature making such solid processing very difficult.

Therefore, a need exists for economical, completely imidized, aromatic imide-containing materials which cure without volatiles and have good thermal capabilities, which are soluble, and which have useful glass transition temperatures for solid processing.

A primary object, therefore, of this invention is to prepare a family of new, processable, economical, completely imidized, aromatic imide-containing materials which are completely soluble, which cure readily with heat, with or without catalyst, giving cross-linked, insoluble, flameresistant products having good thermal-oxidative resistance, such cure not evolving volatiles. As powders, members of this family either melt or have useful glass transition temperatures. The molded products, filled or unfilled, give very tough, void-free, thermally stable structures, having good physical properties. Thick-section laminated products also have good properties. Other applications may include varnishes, wire enamels, impregnating solutions, films, adhesives, fluidized bed powders, foams, etc.

Generally speaking, the present materials are prepared by heating together an organic diamine containing at least two carbon atoms with an acidic material such as trimellitic anhydride or a derivative thereof such as the acid chloride, of which up to about 20 mole percent by weight may be substituted by an aromatic dianhydride. The acidic material can also be composed of up to and including 100 percent of a dicarboxylic acid or aliphatic dianhydride. The diamine is initially in molar excess v. the acidic material in ratios of about 2:1 to about 10:9. Variously, a stoichiometric portion of the diamine can be initially reacted with all of the anhydride or potential anhydride groups in the acidic material, with subsequent addition of the remaining diamine to provide a molar excess of diamine to acidic function. The acid and diamine are heated in a solvent and the reaction can be catalyzed by phosphite esters and the like if desired. Alternatively, if the acidic materials are highly reactive, the reactants are mixed at room temperature or below.

Among the solvents useful in the present connection are dimethyl acetamide (DMAC), N-methyl-2-pyrrolidone (NMP), dimethyl formamide (DMF), and dimethyl sulfoxide (DMSO). Others will be evident to those skilled in the art.

There is then added a stoichiometric amount, or slight excess, of a dienophile material as such or the corresponding diene adduct containing an amine-reactive functional group such as an anhydride, ester, acid chloride, isocyanate, etc. In cases where only dienophile material is used, the diene or cyclic diene adduct can be subsequently prepared at this point. The solution is optionally dehydrated, if required, and used as such or precipitated if desired. If precipitated, the solid is washed free of solvent and contaminants, dried, and used as such, or redissolved prior to use.

Any of a number of diamines alone or in admixture can be used in connection with the present invention including but not limited to 4,4'-diamino-2,2'-sulfonediphenylmethane
ethylenediamine
benzoguanamine
meta-phenylene diamine
para-phenylene diamine
4,4'-diamino-diphenyl propane
4,4'-diamino-diphenyl methane
benzidine
4,4'-diamino-diphenyl sulfide
4,4'-diamino-diphenyl sulfone
3,3'-diamino-diphenyl sulfone
4,4'-diamino-diphenyl ether
2,6-diamino-pyridine
bis(4-amino-phenyl)diethyl silane
bis(4-amino-phenyl)diphenyl silane
bis(4-amino-phenyl)phosphine oxide
4,4'-diaminobenzophenone
bis(4-amino-phenyl)-N-methylamine
bis(4-aminobutyl)tetramethyldisiloxane
1,5-diaminonaphthalene
3,3'-dimethyl-4,4'-diamino-biphenyl
3,3'-dimethoxy benzidine
2,4-bis(beta-amino-t-butyl)toluene
toluene diamine
bis(para-beta-amino-t-butyl-phenyl)ether
para-bis(2-methyl-4-amino-pentyl)benzene
para-bis(1,1-dimethyl-5-amino-pentyl)benzene
m-xylylene diamine
p-xylylene diamine
bis(4-amino-cyclohexyl)methane
hexamethylene diamine
heptamethylene diamine
octamethylene diamine
nonamethylene diamine
decamethylene diamine
3-methyl-heptamethylene diamine
4,4'-dimethylheptamethylene diamine
2,11-diamino-dodecane
1,2-bis-(3-amino-propoxy(ethane
2,2-dimethyl propylene diamine
3-methoxy-hexamethylene diamine
2,5-dimethylhexamethylene diamine
2,5-dimethylheptamethylene diamine
5-methylnonamethylene diamine
1,4-diamino-cyclo-hexane
1,12-diamino-octadecane
2,5-diamino-1,3,4-oxadiazole
$H_2N(CH_2)_3O(CH_2)_2O(CH_2)_3NH_2$
$H_2N(CH_2)_3S(CH_2)_3NH_2$
$H_2N(CH_2)_3N(CH_3)(CH_2)_3NH_2$ and mixtures thereof.

As pointed out above, up to about 20 mole percent of an aromatic dianhydride can be substituted for an equivalent amount of trimellitic anhydride. Considerably greater quantities of dicarboxylic acids or aliphatic or cycloaliphatic dianhydrides as the free acid, acid chloride, ester, etc., can be used up to and including 100 percent of the total acidic material alone or in mixtures. Of the dicarboxylic acid types, azelaic acid, adipic acid, succinic, isophthalic and terephthalic acids, among others, are useful.

Useful dianhydrides alone or in admixture include but are not limited to
pyromellitic dianhydride
2,3,6,7-naphthalene tetracarboxylic dianhydride
3,3',4,4'-diphenyl tetracarboxylic dianhydride
1,2,5,6-naphthalene tetracarboxylic dianhydride
2,2',3,3'-diphenyl tetracarboxylic dianhydride
2,2-bis(3,4-dicarboxyphenyl)propane dianhydride
bis(3,4-dicarboxyphenyl)sulfone dianhydride
3,4,9,10-perylene tetracarboxylic dianhydride
bis(3,4-dicarboxyphenyl)ether dianhydride
ethylene tetracarboxylic dianhydride
naphthalene-1,2,4,5-tetracarboxylic dianhydride
naphthalene-1,4,5,8-tetracarboxylic dianhydride
decahydronaphthalene-1,4,5,8-tetracarboxylic dianhydride
4,8-dimethyl-1,2,3,5,6,7-hexahydronaphthalene-1,2,5,6-tetracarboxylic dianhydride
2,6-dichloronaphthalene-1,4,5,8-tetracarboxylic dianhydride
2,7-dichloronaphthalene-1,4,5,8-tetracarboxylic dianhydride
2,3,6,7-tetrachloronaphthalene-1,4,5,8-tetracarboxylic dianhydride
phenanthrene-1,8,9,10-tetracarboxylic dianhydride
cyclopentane-1,2,3,4-tetracarboxylic dianhydride
pyrrolidine-2,3,4,5-tetracarboxylic dianhydride
pyrazine-2,3,5,6-tetracarboxylic dianhydride
2,2-bis(2,3-dicarboxyphenyl) propane dianhydride
1,1-bis(2,3-dicarboxyphenyl)ethane dianhydride
1,1-bis(3,4-dicarboxyphenyl)ethane dianhydride
bis(2,3-dicarboxyphenyl)methane dianhydride
bis(3,4-dicarboxyphenyl)methane dianhydride
bis(3,4-dicarboxyphenyl)sulfone dianhydride
benzene-1,2,3,4-tetracarboxylic dianhydride
1,2,3,4-butane tetracarboxylic dianhydride
thiophene-2,3,4,5-tetracarboxylic dianhydride
3,3',4,4'-diphenyltetracarboxylic dianhydride
3,4,3',4'-benzophenone tetracarboxylic dianhydride
azobenzene tetracarboxylic dianhydride
2,3,4,5-tetrahydrofuran dianhydride
p-phenylenebis(trimellitate) anhydride
1,2-ethylenebis(trimellitate) anhydride
2,2-propanebis(p-phenylene trimellitate) anhydride
4,4'-[p-phenylenebis(phenylimino)carbonyl] diphthalic anhydride
4,4'-diphenylmethanebis(trimellitamide) anhydride
and mixtures thereof.

As pointed out above, there can be reacted with the acid-diamine reaction product any olefinic dienophile material which contains an amine reactive functional group or is amine reactive. Thus, Diels-Alder adducts of dienes or cyclic dienes with maleic anhydride are included, as are other dienophiles such as acetylene dicarboxylic esters, acrylates, and the like. Among the specific materials alone or in admixture which are useful in this respect are maleic anhydride and halogen- and lower alkyl-substituted maleic anhydrides as well as aromatic, e.g., phenyl-substituted material, citraconic anhydride, tetrahydrophthalic anhydride, itaconic anhydride, alkenyl-substituted succinic anhydride, as well as Diels-Alder reaction products such as cis-endo-5-norbornene-2,3-dicarboxylic anhydride, more commonly known as Nadic or Endic anhydride, or its derivatives, such as alkyl or halogenated derivatives.

It will be understood that when mention of a basic material is made, its derivatives are included. Thus, "trimellitic anhydride" includes the acid chloride and esters.

Following the reaction with olefinic dienophile material, the product can be subsequently reacted with a diene or cyclic diene such as cyclopentadiene or its derivatives, i.e., by cracking its dimer, and then the resulting prepolymer is dehydrated with heat or with chemical agents as required. The reaction product may be finally end-stopped with a monoisocyanate or other suitable material.

The following examples illustrate the practice of the invention, it being realized that they are not to be taken as limiting in any way. All parts are by weight unless otherwise specifically designated.

EXAMPLE 1

Under nitrogen and anhydrous conditions, a stirred mixture of methylenedianiline (MDA; 99 parts), trimellitic anhydride (TMA; 48 parts), 4 drops of triphenyl phosphite, and N-methyl-2-pyrrolidone (NMP; 34.5 parts) containing xylene was heated in the range of 130°–210°C for an hour and then from 210°–250°C during 5 hours with distillation of nine parts of water. The product was diluted with NMP (288 parts). A titration for free carboxyl indicated essentially 100 percent reaction. This solution (200 parts) was treated with maleic anhydride (22.9 parts) with cooling, diluted with NMP (100 parts) and kept at room temperature for 4 hours. The solution was treated with acetic anhydride (29.2 parts) and sodium acetate (1.8 parts) and kept at 55°C for an hour. The material was precipitated into water, washed and dried, and yielded 75.5 parts of a maleimide-containing product. This product had a melting point of about 200°C and was soluble in N,N-dimethylformamide (DMF).

A portion was molded at 215°–230°C and 8,000 psi for 0.5 hour. A hard piece resulted which after a 5-hour postbake at 260°C had a $T_{20}$ of 470°C by thermogravimetric analysis in air. ($T_{20}$ is the temperature at 20 percent weight loss.)

EXAMPLE 2

The procedure of this example will serve as a model for Examples 3–11.

Under nitrogen and anhydrous conditions, a solution of trimellitic anhydride monoacid chloride (TMAC; 13.47 parts) in dry N,N-dimethylacetamide (DMAC) was added at −20°C during 10 minutes to a stirred solution of triethylamine (6.46 parts) and MDA (15.84 parts) in DMAC to give a solution containing 108 parts of DMAC and precipitated triethylamine hydrochloride. The mixture was stirred without cooling bath for 1 hour. It was then cooled to 0°C and filtered to remove triethylamine hydrochloride (8.5 parts). The filtrate was cooled to −20°C and treated with a solution of maleic anhydride (3.45 parts) in DMAC (15.84 parts) and then diluted with DMAC (14.87 parts). The solution was stirred to room temperature and allowed to sit overnight.

Sodium acetate (1.11 parts) and acetic anhydride (19.58 parts) were added and the solution was kept at 53°–56°C for 2 hours, cooled and stirred 4 hours, left overnight, precipitated into water, washed and dried to give 26.5 parts of a maleimide-containing product. The solid had an inherent viscosity (0.5 percent in DMAC) of 0.164 and a glass transition temperature of about 210°C. It was molded at 240°C and 8,000 psi for 1 hour and had a flexural strength of 900 kg/cm$^2$ on a Dynstat machine. The 1/16 inch thick bar lost 10 percent of its weight in 350 hours when isothermally aged at 316°C in a forced air oven. The bar did not crack at 316°C until it had aged for 1,000 hours. A film was cast from DMAC solution and after curing for 1 hour each at 120, 200, 250, and 0.5 hour at 316°C was flexible as a free film to a 180° bend. The one-mil film was isothermally aged at 250°C in a forced air oven and lost 10 percent of its weight in 730 hours.

Using the procedure of Example 2, the raw materials and quantities were varied as shown in Table I, Examples 3 through 11, to provide products as shown in the table.

EXAMPLE 12

Under nitrogen and anhydrous conditions, MDA (59.4 parts) was added at 100°C to a stirred solution of TMA (115.2 parts) in NMP (174.6 parts) containing xylene. Water (10.8 parts) was collected during 2.5 hours at 137°–186°C.

The solution was cooled to 155°C and MDA (89.1 parts) and triphenyl phosphite (0.5 part) were added. The system was heated at 170°–210°C during 18 hours. By titration of residual carboxylic acid, the reaction was essentially 100 percent complete.

The system was cooled and diluted with NMP (483 parts). A portion (814 parts) of the resulting solution was treated with maleic anhydride (27.3 parts), stirred for an hour and allowed to sit overnight. Then it was treated with sodium acetate (2.8 parts), acetic anhydride (52.6 parts), kept at 54°–58°C for 1½ hours, and left overnight. The product was precipitated into water, washed and dried to give 224 parts.

A flexible free film was prepared from DMF solution after being cured one hour each at 120, 200, 250, and 15 minutes at 316°C.

Then a portion of the solid product was placed between sheets of aluminum foil and between platens of a press at 280°–290°C for 20 minutes at 5,000 psi to give a clear, dark red disc which was very tough and flexible.

EXAMPLE 13

A solution of MDA (297 parts) in NMP (207.5 parts) containing xylene was treated at 180°C with TMA (230.4 parts) added portionwise. Heating was continued for 21 hours at 150°–210°C using triethyl phosphite as a catalyst (3 × 0.5 part). Titration of residual car-

TABLE I (Procedure as Shown in Example 2)

| Example | Parts By Weight | | | Maleic Anhydride* | Product | Molding Conditions and Properties | Cured Cast Film and Properties |
| --- | --- | --- | --- | --- | --- | --- | --- |
| | MDA | TMAC + | Other Reactant | | | | |
| 3 | 15.84 | 14.74 | — | 2.14 | 27.9$^e$ | 4 g., 280–325°C/ 8,000 psi/45 min. -Hard Bar; Flexural strength 800 Kg/cm$^2$ | Flexible as in Ex. 2; Isothermal aging at 250°C/air showed 10% wt. loss at 1000 hrs. |
| 4 | 15.84 | 10.78 + | Pyromellitic Dianhydride (PMDA) 2.79 | 3.45 | 24.9 | 4 g., 240–300°C/ 11,000 psi/50 min. -Hard Bar | |
| 5 | 19.9$^a$ | 13.5 | — | 5.41$^b$ | 29.6 | 1 g., 260°C/5,000 psi/5 min., Tough film | |
| 6 | 15.84 | 10.78 + | Azelaoyl Chloride 2.88 | 3.43 | 25.9 | 1 g., 260°C/5,000 psi/ 15 min., Tough Film | Flexible as in Ex. 2 |
| 7 | 15.84 | 10.78 + | Isophthaloyl Chloride 2.60 | 3.43 | 26.2 | 1 g., 260°C/5,000 psi/ 10 min., Tough Film | |
| 8 | 7.92 | 3.37 + | PMDA 0.87 | 4.31 | 12.0 | 4 g., 195–215°C/ 4,000 psi/15 min.; 220–240°C/8,000 psi/ 40 min.-Hard Bar | |
| 9 | 7.92 | 3.37 + | PMDA 0.87 | 6.72$^b$ | 14.4 | 4 g., 190–260°C/ 8,000 psi/10 min., Flowed at 260°C, Insoluble in DMF - Cured | |
| 10 | 198. | 105.2 | — | 100. | 352$^c$ | | Flexible as in Ex. 2 |
| 11 | 67.5 | 62.8 | — | 10.60$^d$ | 110 | | Flexible as in Ex. 2 |

*Unless noted, all maleic anhydride examples used acetic anhydride and sodium acetate for dehydration.
$^a$Diaminodiphenyl sulfone
$^b$cis-endo-5-Norbornene-2,3-dicarboxylic anhydride; dehydration by azeotropic distillation of water
$^c$Had a melting range of 130–160°C and had an inherent viscosity (0.5% in DMAC) of 0.076
$^d$cis-Δ4-Tetrahydrophthalic anhydride
$^e$Inherent viscosity (0.5% in DMAC) = 0.173; glass transition temperature 225°C boxyl showed the reaction to be essentially 100 percent complete. The product was diluted to 25 percent solids. A portion (835 parts) was treated with cis-endo-5-norbornene-2,3-dicarboxylic anhydride (48.1 parts) and heating was continued during 7 hours at 170°–185°C. Phenyl isocyanate (8.1 parts) was added at intervals during 12 hours. Heating was continued at 150°–180°C until carbon dioxide evolution ceased.

A film was cast from the solution and cured 15 minutes each at 180°C and 230°C and 1 hour at 316°C and was flexible to a 180° bend. This film lost 10 percent of its weight after 550 hours at 250°C in a forced air oven.

EXAMPLE 14

A diamine solution (40 parts) prepared as in Example 13 at 25 percent solids was treated with tetraprophenylsuccinic anhydride (3.2 parts) and rolled in a sealed jar for 4 hours at room temperature. A free film was flexible to a 180° bend when prepared by curing a cast film 1 hour each at 125, 200, 250 and 30 minutes at 302°C.

EXAMPLE 15

A diamine solution (20 parts) prepared as in Example 13 at 25 percent solids was treated with 3,3′,4,4′-benzophenone tetracarboxylic dianhydride (BTDA) (0.5 part). This produced a gel. The gel was broken after 3 hours in a 100°C oven and 7 hours in a 120°C oven. Then cis-endo-5-norbornene-2,3-dicarboxylic anhydride (0.5 part) was added and the resulting solution rolled in a closed jar for 30 minutes and kept at room temperature overnight. A film was cast from solution and cured as in Example 14. It was flexible to a 180° bend.

EXAMPLE 16

A diamine solution prepared as in Example 13 was made from MDA (297 parts), TMA (230.4 parts), NMP (484 parts), triphenyl phosphite (0.5 part), and xylene was diluted to 25 percent solids and treated with maleic anhydride (60 parts) to give maleamic acid solution. A 1-mil film was cast from the solution and cured 1 hour each at 120, 200, and 250, and 15 minutes at 316°C and was flexible to a 180° bend. The film lost 10 percent of its weight in 900 hours at 250°C in a forced air oven.

EXAMPLE 17

A portion (1,847 parts) of maleamic acid solution prepared as in Example 16 was treated with acetic anhydride (122.4 parts) and sodium acetate (6.5 parts), kept at about 55°C for 2 hours and let set overnight. A portion (994 parts) of the reaction solution was precipitated into water, washed, and dried to give 261 parts.

A portion was dissolved in NMP and a film was cast and cured one hour each at 120, 200, 250, and 20 minutes at 302°C. The 1-mil film was flexible to a 180° bend. A 15-mil film was flexible to a 160° bend.

A portion was molded at 250°C/8,000 psi/one hour to give a 1/8 inch bar. The bar was postbaked 15 hours at 250°C. The bar lost 1.6 percent of its weight in 2,100 hours at 250°C in a forced air oven and then 7 percent further in 1,100 hours at 300°C in a forced air oven without cracking.

A piece of a molded bar was held in the flame of Bunsen burner and then removed. It did not burn.

EXAMPLE 18

MDA (109 parts) was added to NMP (178 parts) containing xylene. TMA (84.8 parts) was added, the reaction was heated to 175°C and triphenyl phosphite (0.16 part) was added. Heating was continued for 36 hours at 175°–210°C. Titration of residual carboxyl showed the reaction to be essentially complete. The product was cooled, cut with NMP (357 parts), and cooled further to 50°–60°C. Maleic anhydride (23.5 parts) was added and blended for 5 hours. Acetic anhydride (45 parts) and sodium acetate (2.4 parts) were added, the batch was held at 55°–60°C for 3 hours and cooled. The product was precipitated into water, filtered, washed, and dried to give 190 parts.

A portion was dissolved in DMF, filtered, precipitated into water, and the solid washed and dried. A bar was prepared from the powder in a mold at 250°C and 8,000 psi for an hour. The bar was postbaked for 24 hours at 270°C and had a flexural strength of 25,000 psi and a flexural modulus of $5.9 \times 10^5$ psi, measured at room temperature on an Instron machine. When the test was run at 250°C on another bar, the flexural strength was 16,000 psi and the flexural modulus was $4.1 \times 10^5$ psi.

A 35 percent solids solution was made from the batch product and filtered. Glass cloth, fabric style 7781 with A 1,100 S finish, was singly and doubly hand dipped and dried. A lay-up alternating 33 percent and 47 percent resins content strips was preformed at 150°C and 10 psi. It was pressed at 250°C and 2,000 psi to give a smooth laminate having a flexural strength of 43,000 psi and a flexural modulus of $3.9 \times 10^6$ psi measured on an Instron machine.

EXAMPLE 19

A solution of isophthaloyl chloride (10.2 parts) in DMAC was added to a solution of MDA (19.8 parts) in DMAC at −20°C to −10°C. The reaction product was stirred 1.5 hours as it came to room temperature. Titration showed the reaction to be essentially complete. A solution of maleic anhydride (9.8 parts) in DMAC was added at −20°C and allowed to stir 1 hour. The reaction was dehydrated as in Example 2 and precipitated into water, washed, and dried to give 21 parts.

A portion was placed in a mold and pressed at 250°–280°C for an hour at 8,000 psi to give a smooth, void-free piece.

EXAMPLE 20

A mixture of MDA (79.2 parts), azelaic acid (37.6 parts), NMP (27.4 parts) and xylene was heated at 165°–250°C during 5 hours to give the theoretical quantity of water. The product was diluted to 20 percent solids with NMP (411 parts). A portion (300 parts) was treated with maleic anhydride (33.7 parts) and heated to 120°C. Flexible-free films are prepared from this product.

There are provided by this invention new and useful prepolymers from which can be prepared strong, tough, void-free molded structures. The prepolymers are soluble in readily available solvents and can in this state be used for preparing films. Laminated using fabrics or cloths of all types as well as oriented fibers,

What I claim as new and desire to secure by Letters Patent of the United States is:

1. The reaction product of (1) the reaction product of excess diamine containing at least two carbon atoms with an acidic material selected from (a) trimellitic anhydride, (b) trimellitic anhydride with up to 20 mole percent substituted by aromatic dianhydride, and (c) trimellitic anhydride with up to 100 percent by weight of material selected from dicarboxylic acid and aliphatic dianhydride and (2) olefinic dienophile material having amine reactivity selected from (a) Diels-Alder adducts of dienes with maleic anhydride, (b) acetylene dicarboxylic esters, (c) acetylene dicarboxylic acrylates, (d) maleic anhydride, (e) halogen-, lower alkyl- and aromatic-substituted maleic anhydride, (f) citraconic anhydride, (g) tetrahydrophthalic anhydride, (h) itaconic anhydride, (i) alkenyl-substituted succinic anhydride, (j) cis-endo-5-norbornene-2,3-dicarboxylic anhydride, and (k) alkyl and halogenated derivatives of cis-endo-5-norbornene-2,3-dicarboxylic anhydride.

2. The cured product of claim 1.

3. The dehydrated imidized product of claim 1.

4. The product of claim 1 wherein said aromatic dianhydride is selected from pyromellitic dianhydride, benzophenone dianhydride and mixtures thereof and said diamine is selected from meta-phenylene diamine, methylenedianiline, diaminodiphenyl sulfone, oxydianiline and mixtures thereof.

5. The product of claim 1 wherein said dicarboxylic acid is selected from azelaic acid, adipic acid, succinic acid, isophthalic acid, terephthalic acid, and mixtures thereof.

6. The product of claim 1 wherein said dienophile material is selected from maleic anhydride and halogen, lower alkyl and aromatic substituents and mixtures thereof.

7. A film prepared from the product of claim 1.

8. A laminate using the product of claim 1 as a binder.

9. A molded structure prepared from the product of claim 1.

10. The product of claim 1 which is end-capped with monoisocyanate.

* * * * *